(No Model.)

J. M. DODGE.
CONVEYING MECHANISM.

No. 476,615. Patented June 7, 1892.

Witnesses:
Hamilton D. Turner.
William D. Conner.

Inventor:
James Mapes Dodge
by his Attorneys
Howson & Howson

UNITED STATES PATENT OFFICE.

JAMES M. DODGE, OF PHILADELPHIA, PENNSYLVANIA.

CONVEYING MECHANISM.

SPECIFICATION forming part of Letters Patent No. 476,615, dated June 7, 1892.

Application filed November 17, 1891. Serial No. 412,191. (No model.)

*To all whom it may concern:*

Be it known that I, JAMES M. DODGE, a citizen of the United States, and a resident of Philadelphia, Pennsylvania, have invented certain Improvements in Conveying Mechanism, of which the following is a specification.

The object of my invention is to reduce the friction between an endless-chain conveyer and the trough on which the material to be conveyed is supported. Prior to my invention in conveyers of this class the trough has been made straight, or, in other words, parallel with a line drawn through the center of the two chain-carrying wheels. Consequently the trough not only supported the material being conveyed, but also supported the chain and its flights. Consequently the friction between the flights and the trough was very great, using considerable of the power that was required to operate the mechanism. I overcome this objection in the following manner, reference being had to the accompanying drawings, in which—

Figure 1:
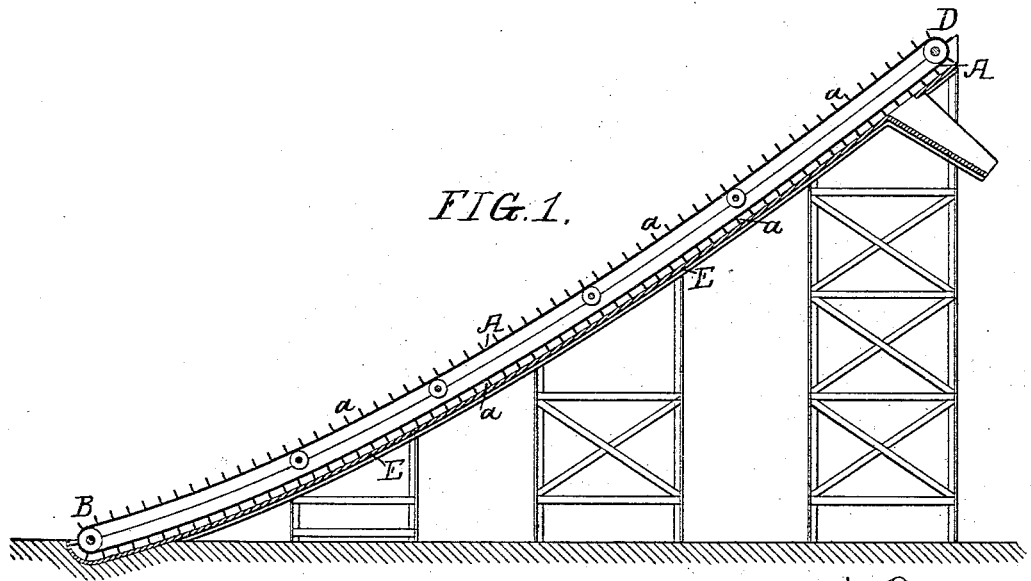
Figure 2:
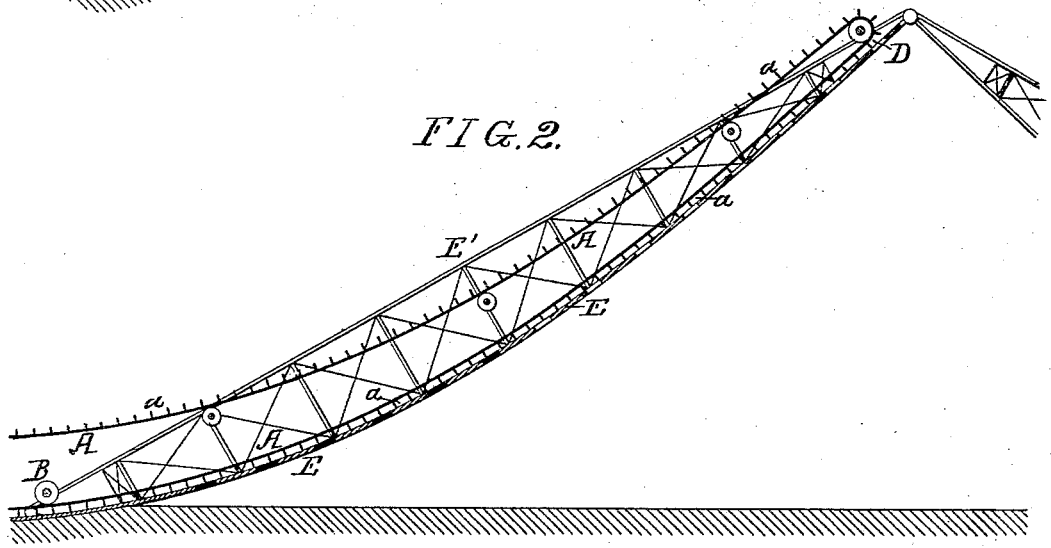
Figure 3:
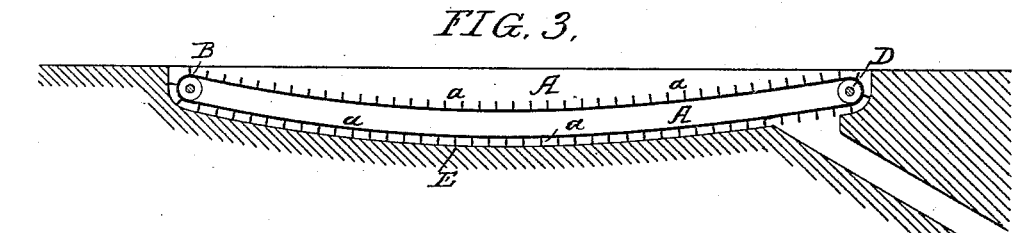

Figure 1 is a sectional view of an inclined conveyer, showing the conveyer-chain and trough, the trough being mounted on suitable supporting-posts throughout its length. Fig. 2 is a sectional view illustrating the troughs supported by a truss structure, the space under the truss being open to receive material, if necessary; and Fig. 3 is a view showing a horizontal conveyer with my improvement.

A is the conveyer chain or rope, having suitable flights *a*. The conveyer passes around a chain-wheel B at the base, mounted on suitable bearings, and around the chain-wheel D at the upper end, also mounted on a suitable bearing. The chain between the two points B and D has a certain amount of sag, as shown clearly in Fig. 1, according to the weight of the conveyer and according to the distance apart of the two points from which the conveyer is suspended. After determining this sag I mount under the carrying-run of the conveyer the trough E, the face of the trough being on a line substantially parallel with the sag-line of the conveyer and so situated in respect to the conveyer that it will not support its entire weight under ordinary working conditions; but it will be suspended between the wheels B and D, so that when the material to be carried up the incline trough is fed to the conveyer it will be supported by the trough and carried forward thereon up to the point of discharge. Thus I considerably reduce the friction, and consequently can use less power in machines of this class.

In Fig. 2 I have shown a truss E', supporting the trough E, the truss also supporting the upper conveyer-wheel D. In this class of conveyers the material may be piled under the truss, being preferably discharged at intervals throughout the length of the truss. My invention may be used, also, in connection with horizontal conveyers, as clearly shown in Fig. 3.

It will be understood that the face of the trough need not be exactly parallel with the sag-line of the conveyer, but must not have a curve so great that the flights will ride over the material on the trough instead of conveying it, and that a rope may be used in place of the conveying-chain.

I claim as my invention—

The combination, in a conveyer, of the conveying-chain, the conveying portion of which is sagged or curved, flights carried by said chain, and carriers for the chain, with a trough under the conveying portion adapted to support the material being conveyed, the face of said trough being substantially parallel with and conforming to the curve or sag-line of the chain, substantially as described.

In testimony whereof I have signed my name to this specification in the presence of two subscribing witnesses.

JAMES M. DODGE.

Witnesses:
HENRY HOWSON,
WILLIAM D. CONNER.